UNITED STATES PATENT OFFICE.

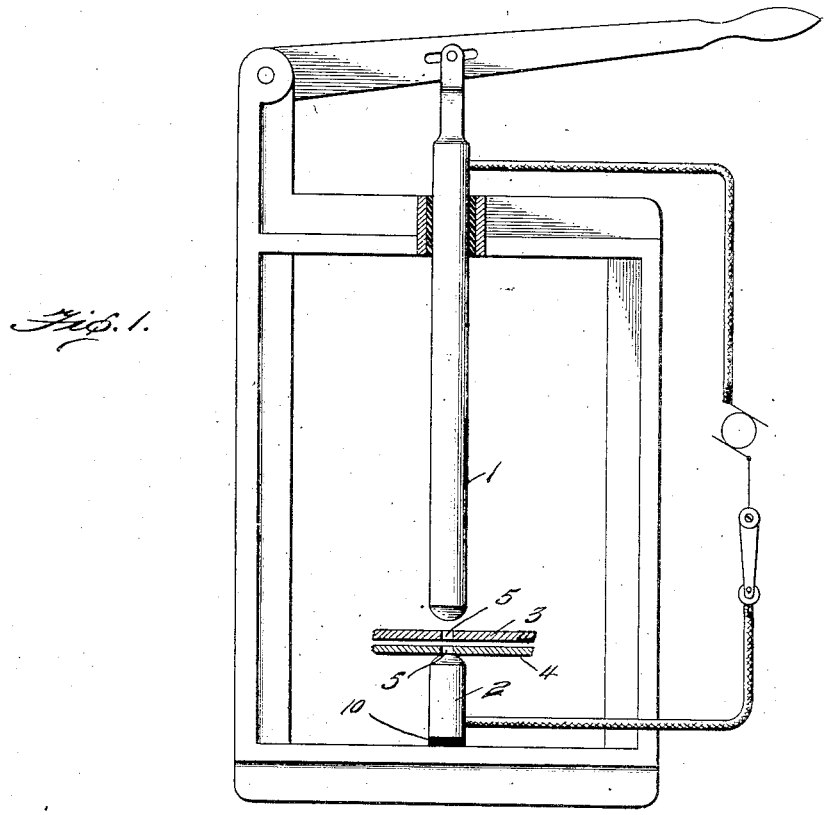
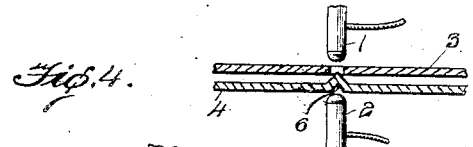
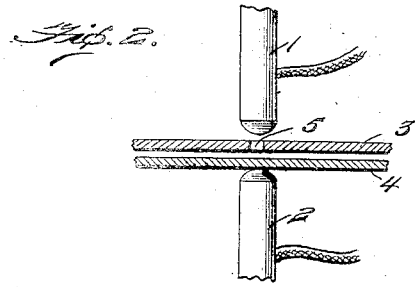
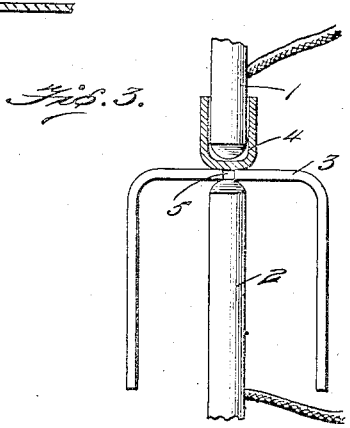

LAURENCE S. LACHMAN, OF NEW YORK, N. Y.

PROCESS OF ELECTRIC WELDING.

No. 904,881.   Specification of Letters Patent.   Patented Nov. 24, 1908.

Application filed May 8, 1907, Serial No. 372,504. Renewed April 23, 1908. Serial No. 428,738.

*To all whom it may concern:*

Be it known that I, LAURENCE S. LACHMAN, a citizen of the United States, residing at New York, in the borough of Manhattan, county and State of New York, have invented certain new and useful Improvements in a Process of Electric Welding; and I do hereby declare the following to be a full, clear, and exact description of the same, such as will enable others skilled in the art to which it appertains to make and use the same.

This invention relates to processes of electric welding and consists in a method of forming autogenous spot welds between pieces of metal by means of welding currents passed through localized areas of such pieces; all as more fully hereinafter set forth and as claimed.

In the prior art many attempts have been made to unite metals by electric welding but this has substantially only proved feasible where the articles or pieces of metal to be welded have been of comparatively small scross-section, as in butt-welding rods and wires; that is, uniting rods or wires end to end; or where, as in prior applications filed by me, special measures are taken to localize and limit the area of electric contact and of the weld. Where the objects to be united are comparatively large and have relatively large abutting or contacting surfaces it is practically impossible to pass sufficient current to unite them in a manner analogous to this butt welding; that is to unite them by a large-area weld between abutting surfaces. Further, when the objects are of comparatively little volume while having comparatively large surface, as in the case of sheet metal objects, such heavy currents as are necessary to effect large area welds are detrimental to the metal.

In the present invention, in lieu of attempting to weld the entire abutting surfaces of two metal objects, as in the prior art, I unite such surfaces by a spot weld, securing the two objects together at one point. These spot welds I secure by passing the welding current through the two objects in a localized contact area of comparatively small dimensions and comparatively high resistance. In the present embodiment of my invention, spot welds are secured by locally increasing the resistance of the metal at the point of intended union by perforating one or both of the pieces of metal at this point and using an electrode terminal of somewhat larger diameter than the perforation and adapted to overlap the margin of such perforation. On passing current, its direct path is then through an annulus between the two pole pieces, the annulus offering a comparatively small total cross-section of metal for the current, of great total resistance, such resistance being, moreover, variably distributed: greater at the surfaces in contact with the poles than in the body of metal, where the current, so to speak, fans out laterally somewhat. As the heating due to imperfect contact of pole and metal is also at the surface, and this may be and very likely is even greater than the true resistance heating, the sum of the results is that the metal at the margin of the perforation flows into the orifice, under the pressure of the poles and because of its own fluidity, or plasticity, fills said perforation completely, if so desired and if the operation is properly performed, and welds itself at the same time to the similarly flowing metal in the orifice of the other body of metal, if both bodies were perforated, or to the surface of the other body, if the latter was imperforate. With such an imperforate body, the metal of the surface abutting on the perforation of the other body also flows into the perforation. The result is a spot weld, firmly and autogenously uniting the two bodies of metal. If such bodies are of comparatively great superficial area where joined, as in the case of two metal sheets, a plurality of such spot welds are produced at separate isolated and properly spaced points. If one of them is of no great dimensions, as in the case of joining a rod to a sheet, one such spot weld may be, and usually is, quite sufficient.

In the accompanying illustration, I have shown, more or less diagrammatically, certain utensils and articles as used in the practice of my process. In this drawing:

Figure 1 indicates a method of welding together two sheets of metal in the manner above described, both of said sheets being perforated; the figure showing said sheets in section placed between welding terminals; Fig. 2 is a similar view in which but one of the sheets is shown perforated; Fig. 3 is another similar view illustrating the welding of an imperforate body of large cross-section, such as a rod, to a plate, the latter perforated; and Fig. 4 is another similar view showing a perforate sheet and an imperforate, the latter being provided with a projection extending into the perforation of the former.

In Fig. 1, 1 and 2 respectively are welding poles or terminals to be connected to any suitable source of welding current; 3 and 4 are two perforated plates arranged with their perforations in line. The perforations 5 are somewhat smaller in diameter than are the poles. These latter are, as shown, preferably formed with a slight rounding off of the end. When the current is passed between the poles, the annular area of contact with the plates forms a spot of high resistance on either side of the plates to be joined, and an annulus of similar size in line with the other annuli forms a similar spot between the two plates. And as these narrow annuli of metal form the path for the high amperage currents flowing from pole to pole, they also become highly heated. Under the influence of the heat and of the pressure from the rounded ends of the poles, the metal of the margins is forced down into the orifice, uniting with that flowing in the corresponding orifice of the other plate and forming a firm, permanent and autogenous spot weld between the two plates.

The operation with the structure of Fig. 2 is exactly the same save that the flowing metal of the perforated plate unites with the surface of the imperforate plate, the surface metal of the latter being usually forced up into the perforation of the other plate to some extent.

The operation in Fig. 3 is the same, except that a hollow bar of metal replaces the imperforate plate of Fig. 2.

In carrying out the welding operation by the methods above described, owing to the fact that the welding terminal or terminals covering the perforation or perforations in one or both of the objects to be welded are somewhat broader than such perforations and also are slightly rounded or pointed, the area of contact of such terminal or terminals with the object or objects to be welded is at first relatively small so that the heating effect is exceedingly great, though confined to the restricted region immediately surrounding the perforation or perforations; and as the metal softens and spreads under the influence of pressure of the terminals, this contact area increases; nevertheless the area raised to welding condition is usually, if not always, in practice smaller in diameter than the diameter of the welding terminals, and therefore the softened or fused metal is confined and prevented from spreading out laterally, but to the contrary is caused to spread into and fill the perforation or perforations; and in like manner the greater portion of the heat that might otherwise be radiated is confined to the immediate area of the weld, so that as little of the heat is wasted as possible. If the metals joined are dissimilar metals, as for example steel to brass, the piece perforated is that of lower conductivity, the steel in the instance cited. I can also provide a point on the metal of higher conductivity which will project up into the perforation of the other piece, as is shown in Fig. 4, reference numeral 6 designating a struck-up protuberance on plate 4.

What I claim is:—

1. The process of uniting two bodies of metal by a spot weld, which consists in providing at least one of such bodies with a perforation, placing said bodies of metal together, and passing an electric welding current through said bodies in the region immediately surrounding such perforation and thereby raising the temperature of the entire body of metal in such region until such metal is soft and fluent, and applying pressure, and thereby causing the metal to flow into such perforation and welding the objects together.

2. The process of uniting two bodies of metal by a spot weld, which consists in providing at least one of such bodies with a perforation, placing said bodies of metal together, placing a terminal of somewhat greater area than said perforation over the same and in contact with the metal around said perforation, and passing an electric welding current through said terminal and through said bodies in the region immediately surrounding such perforation and thereby raising the temperature of the entire body of metal in such region until such metal is soft and fluent, and applying pressure, and thereby causing the metal to flow into such perforation and welding the objects together.

3. The process of uniting two bodies of metal by a spot weld, which consists in providing at least one of such bodies with a perforation, placing said bodies of metal between terminals of greater area than the said perforation, one of said terminals covering said perforation, and passing an electric welding current through said terminal and through said bodies in the region immediately surrounding such perforation and thereby raising the temperature of the entire body of metal in such region until such metal is soft and fluent, and applying pressure, and thereby causing the metal to flow into such perforation and welding the objects together.

4. The process of uniting two bodies of metal by a spot weld which consists in providing one such body with a perforation, placing the perforated piece of metal in contact with the metal to be united thereto, placing a pair of poles of somewhat greater area than said perforation in contact with the two pieces of metal, passing a welding current between the poles and simultaneously forcing the poles together until marginal metal flows into said perforation and unites the two pieces of metal with an autogenous weld.

5. The process of uniting two bodies of metal by a spot weld which consists in providing one such body with a perforation, placing the perforated piece of metal in contact with the metal to be united thereto, placing in contact with the edge only of the perforation an electrode of greater diameter than said perforation, passing a welding current through the electrode and simultaneously forcing the electrode and the pieces of metal together until the metal on the edge of the perforation flows into said perforation and unites the two pieces of metal with an autogenous weld.

6. The process of uniting two bodies of metal by a spot weld which consists in providing one such body with a perforation, placing the perforated piece of metal in contact with the metal to be united thereto, placing in contact with the edge only of the perforation a pointed electrode the main portion of which has a diameter greater than said perforation and the point of which enters said perforation, so securing limited initial contact and a high initial welding temperature, and passing a welding current through the electrode and bodies of metal and simultaneously forcing the electrode and the pieces of metal together until the metal on the margin of the perforation flows into said perforation and unites the two pieces of metal with an autogenous weld, the area of contact of the electrode extending as the metal softens.

In testimony whereof I have signed this specification in the presence of two subscribing witnesses.

LAURENCE S. LACHMAN.

Witnesses:
  LEO J. MATTY,
  H. M. MARBLE.